May 29, 1962  J. BRYANT  3,037,118
ELECTRICAL COUNTING CIRCUITS
Filed Jan. 28, 1958  2 Sheets-Sheet 1

INVENTOR
JACK BRYANT
BY
ATTORNEYS

United States Patent Office 3,037,118
Patented May 29, 1962

3,037,118
ELECTRICAL COUNTING CIRCUITS
Jack Bryant, Chesham Bois, Amersham, England, assignor to United Kingdom Atomic Energy Authority, London, England
Filed Jan. 28, 1958, Ser. No. 711,708
Claims priority, application Great Britain Feb. 6, 1957
6 Claims. (Cl. 250—83.6)

This invention relates to dead-time loss compensating circuits for use when counting events with detectors which produce an electrical pulse for each detected event.

When using such a detector to detect events which are randomly distributed in time, such as a Geiger-Müller tube for detecting nuclear radiations from radioactive substances, some events are missed owing to the finite resolving time or "dead-time" either of the detector itself, or possibly of an associated circuit, e.g. a pulse amplifier. (A "detector" is to be taken hereinafter as including such an associated circuit where used, and a "detected" event includes an event for which a corresponding pulse is produced at the output of such a circuit.) Thus to obtain a true count of the number of events, it is necessary to estimate the number undetected in this way of calculation from the observed count, the counting period, and the dead-time period. Where the mean frequency of arrival of events is not constant (as distinct from the statistical fluctuations always associated with randomly occurring events) but varies from time to time, as for example when counting radiations from decaying radioactive substances, the calculation may be difficult or impossible to perform. Hence a counting system which automatically corrected for dead-time loss would be of advantage and would be of particular advantage where the mean frequency of the events varied with time.

It is an object of the present invention to provide a circuit which automatically compensates, at least in part, for the dead-time loss.

According to the present invention a dead-time loss compensating circuit suitable for use with a detector which produces an electrical pulse for each detected event of a series comprises means for generating a second series of pulses whereof each is delayed by a fixed amount from each pulse corresponding to an event detected by the detector, gate means for accepting those pulses in said second series occurring substantially during dead-time periods following each detected event, and means whereby the accepted pulses of said second series may be added to the pulses corresponding to detected events, whereby the said accepted pulses compensate, at least in part, for those events undetected during said dead-time periods and the number of events in the series can thus be counted more accurately.

The circuit may comprise means for defining the dead-time period, and said second series of pulses may be delayed by a period equal to approximately twice the dead-time period.

The gate means may operate to accept pulses in the second series during periods slightly longer than the dead-time period to compensate, at least in part, for the absence, from said second series of pulses, of pulses corresponding to events undetected during said dead-time periods.

Also according to the present invention a dead-time loss compensating circuit suitable for use with a Geiger-Müller tube comprises means for generating a quenching waveform for said tube, means for deriving a first series of pulses from the leading edges of the quenching waveforms, means for generating a second series of pulses delayed by a fixed amount from said leading edges, gate means controlled by said quenching waveform for accepting those pulses in said second series occurring substantially during the period of said quenching waveform, and means for adding the accepted pulses of said second series to the first series of pulses, whereby the accepted pulses compensate, at least in part, for the unclear particles undetected by the Geiger-Müller tube during the period of the quenching waveform and the number of particles entering the tube can thus be counted more accurately.

The means for generating the second series of pulses may comprise means triggered from the back edges of the quenching waveforms for generating a rectangular waveform of duration approximately equal to that of the quenching waveform, and means for deriving said second series of pulses from the trailing edges of said rectangular waveforms.

The principle of operation of the circuit of the present invention is as follows:

Events occurring during the dead-time periods are lost. If such lost events could be recorded independently and their number added to the number of events detected by the detector, the true number of events would be obtained.

Now consider a second independent series of random events occurring at the same mean frequency as that of the series of events applied to the detector. The number of events of this second series which occur during detector dead-time periods will, on the average, also equal the number of lost events. Consequently, if the events of this second series which occur during detector dead-time periods are counted, and their number added to the number of events detected by the detector, an approximation to the true number of events will be obtained. The approximation occurs because the events occur at random, and the usual probabilities of observing such events during finite intervals apply. It may be noted, however, that if the number of events missed due to the detector dead-time is estimated by a correction formula, there are similar uncertainties because the events occur at random.

A second series of random events occurring at the same mean frequency as that of the series of events applied to the detector may be obtained by delaying the latter series by a suitable time. In the present invention an approximation to such a second series is obtained by delaying the series of events detected by the detector. This series contains fewer events than the series applied to the detector by the number of events lost due to the detector dead-time. Consequently in using this series to obtain a corrected count in the manner described, the corrected count is too small by approximately the second order of the dead-time loss. It is possible however to reduce the inaccuracies due to this loss by counting the delayed events which occur during periods which are slightly extended detector dead-time periods.

By way of example an embodiment of the present invention for use with a Geiger-Müller tube will now be described with reference to the accompanying drawings wherein.

Figures 1, 3:
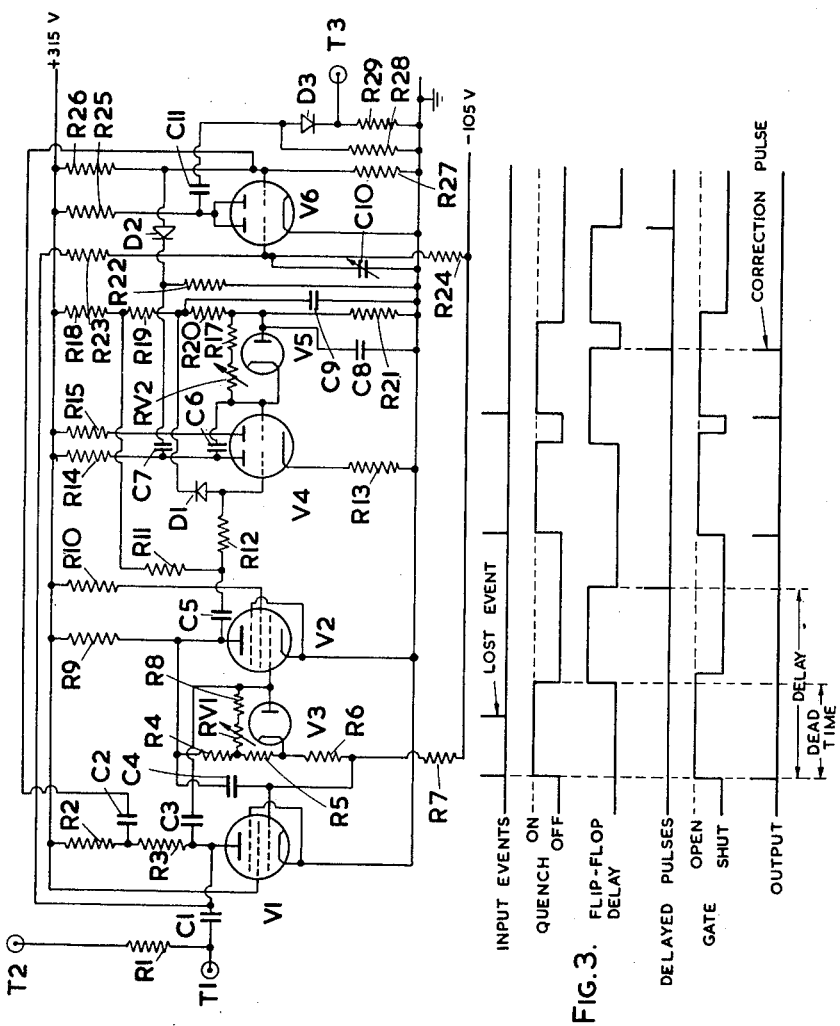
FIG. 1 is a circuit diagram of the embodiment.
FIG. 3 is a diagram illustrating the method of operation of the embodiment of FIG. 1.
Figure 2:
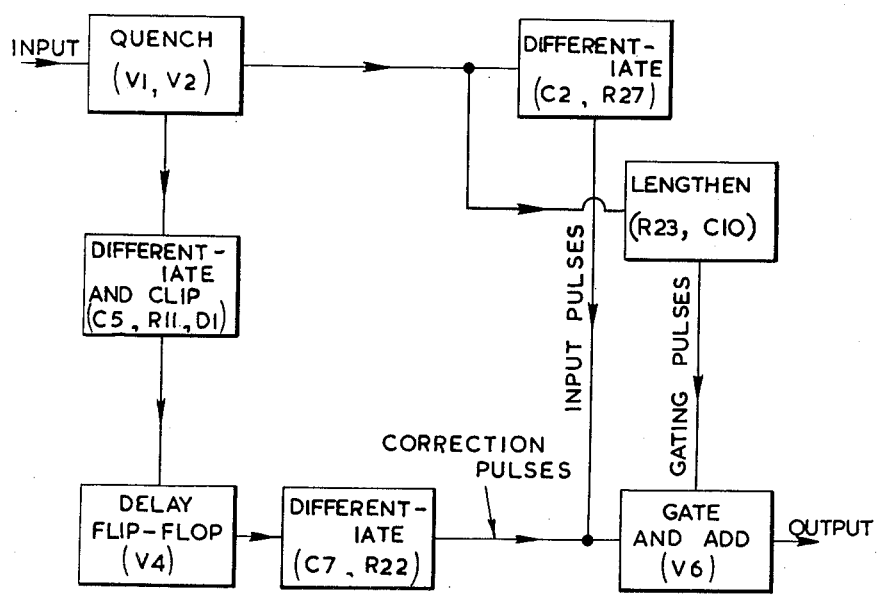
FIG. 2 is a block schematic diagram of the embodiment of FIG. 1.

Referring firstly to FIG. 1, an input terminal T1, to which a Geiger-Müller tube may be connected, is shown connected through a capacitor C1 to the anode of a pentode valve V1. There is also provided a second terminal T2, connected to T1 through a resistor R1, which may be connected to a positive voltage supply to supply the HT for the tube. The valve V1, together with a pentode valve V2 and their associated components connected as shown, form a quenching circuit of the kind described by Cooke-Yarborough, Florida and Devey in the Journal of Scientific Instruments, volume 26, page 124 et seq., 1949, for defining accurately the dead-time of the Geiger tube. V1 is the normally non-conducting valve, but the arrival of a negative pulse from the tube cuts off V2 for a period depending on the setting of a variable resistor RV1. During this period V1 is conducting, and the resultant negative rectangular quenching waveform applied to the tube through C1 serves to define the dead-time thereof.

The corresponding positive rectangular waveform at the anode of V2 is fed through a differentiating circuit consisting of a capacitor C5 and a resistor R11 to a conventional flip-flop circuit comprising the two halves of a double triode valve V4, the L.H. side of which is normally conducting. The positive differentiated pulse is clipped by a rectifier D1. The negative differentiated pulse, which is coincident with the back edge of the quenching waveform, triggers the flip-flop to produce a positive rectangular pulse at the L.H. anode of V4, the duration of which depends on the setting of a variable resistor RV2. This rectangular pulse is differentiated by a capacitor C7 and a resistor R22 and the negative differential pulse, which is coincident with the back edge of the rectangular pulse or the L.H. fed through a rectifier D2 to the R.H. grid of a double triode valve V6 which operates as a gate. This negative differential pulse is thus delayed with respect to the pulse from the Geiger tube by a time equal to the duration of the quenching waveform plus the duration of the rectangular flip-flop pulse on the L.H. anode of V4. The R.H. grid also receives negative pulses from the anode of V1, these pulses being produced by the differentiating action of a capacitor C2 and a resistor R27 on the front edge of the quenching waveform, and thus being coincident with the pulse from the Geiger tube.

The gating pulse, which is a negative rectangular pulse applied to the L.H. grid of V6, is the quenching waveform derived from the anode of V1 and slightly lengthened by a resistor R23 and a capacitor C10. V6 has its two anodes connected together and normally conducts hard through both. Hence the negative pulses applied to its R.H. grid can only produce corresponding positive pulses at the anodes during these periods when the L.H. side is cut off by the gating pulse. Positive output pulses are fed from the anodes of V6 through a capacitor C11 and a rectifier D3 to an output terminal T3, which is normally connected to a ratemeter or scaler.

Referring now also to FIG. 3, it will be seen that each of three random input events which does not occur during the quenching period following a preceding detected input event, is detected by the tube and produces a pulse which passes through the circuit and, suitably shaped, appears at the output. One event is shown as occurring during the quenching period of the first detected event and is therefore not detected. In addition, the flip-flop is triggered by the back edge of the quenching pulse, and a delayed pulse is produced at the back edge of the flip-flop pulse. Thus a series of delayed pulses is produced, and such of these as are produced during the quenching period of a following pulse pass through the gate and also appear at the output. It will be seen, for example, that the delayed pulse resulting from the second detected event is passed through the gate by the quenching waveform of the third detected event to provide a correction pulse at the output.

The total delay between an input pulse and the delayed pulse produced therefrom is equal to the sum of the quenching period and the flip-flop delay period. It may be shown that, if the total delay is less than or greater than twice the quenching period, the count will be under-corrected, this undercorrection being additional to that resulting from the delayed series containing fewer events than the input series. Hence FIG. 3 shows the flip-flop delay period as equal to the quenching period. In practice, however, the circuit must be designed so that small changes in circuit parameters, due for example to the ageing of components, have a minimum effect on the performance. As the error resulting from a total delay greater than twice the quenching period is less than that resulting from a total delay less than twice the quenching period, a total delay of about 2½ times the quenching period is used in practice.

As previously mentioned, the delayed series contains fewer pulses than the true number of events to be counted by the number lost during detector dead-times. This loss is partially compensated by introducing resistor R23 and capacitor C10 to make the gating waveform slightly longer than the quenching waveform. In practice, Geiger-Müller tubes used for accurate counting work are seldom used at counting rates at which the dead-time loss exceeds 10%. A practical choice of the period for which the gate circuit remains open after the end of the quenching pulse is therefore 0.1 times the tube dead-time period.

The following components were used in a circuit providing a quenching period of 400 $\mu$sec., a gating period of 440 $\mu$sec. and a total delay of 1000 $\mu$sec.:

| | |
|---|---|
| $R1=10$ M$\Omega$ | $R27=470$ k$\Omega$ |
| $R2=22$ k$\Omega$ | $R28=470$ k$\Omega$ |
| $R3=47$ k$\Omega$ | $R29=50$ k$\Omega$ |
| $R4=330$ k$\Omega$ | $RV1=2$ M$\Omega$ |
| $R5=10$ k$\Omega$ | $RV2=1$ M$\Omega$ |
| $R6=47$ k$\Omega$ | $C1=0.01$ $\mu$f. |
| $R7=330$ k$\Omega$ | $C2=10$ pf. |
| $R8=1$ M$\Omega$ | $C3=100$ pf. |
| $R9=56$ k$\Omega$ | $C4=15$ pf. |
| $R10=82$ k$\Omega$ | $C5=22$ pf. |
| $R11=470$ k$\Omega$ | $C6=0.001$ $\mu$f. |
| $R12=47$ k$\Omega$ | $C7=100$ pf. |
| $R13=20$ k$\Omega$ | $C8=0.05$ $\mu$f. |
| $R14=20$ k$\Omega$ | $C9=0.05$ $\mu$f. |
| $R15=20$ k$\Omega$ | $C10=50-150$ pf. |
| $R17=470$ k$\Omega$ | $C11=100$ pf. |
| $R18=220$ k$\Omega$ | $V1=CV138$ |
| $R19=20$ k$\Omega$ | $V2=CV138$ |
| $R20=20$ k$\Omega$ | $V3=CV140(½)$ |
| $R21=82$ k$\Omega$ | $V4=CV858$ |
| $R22=22$ k$\Omega$ | $V5=CV140(½)$ |
| $R23=2.2$ M$\Omega$ | $V6=CV858$ |
| $R24=1$ M$\Omega$ | $D1=CV448$ |
| $R25=100$ k$\Omega$ | $D2=CV448$ |
| $R26=8.2$ M$\Omega$ | $D3=CV448$ |

It will be appreciated that, to improve the accuracy, it is possible to obtain second-order correction by deriving a second delayed series from the series of correction pulses, and applying this second delayed series to the gate to obtain a second series of correction pulses which is added to the output. The effective correction then extends to dead-time losses of 20% or so. The improvement at smaller losses is small however, and as Geiger-Müller tubes are liable to other errors at large counting rates, the additional complexity of the circuit is unlikely to be justified in most circumstances.

I claim:
1. A dead-time loss compensating circuit suitable for use with a detector which produces an electrical pulse for each detected event of a series, comprising means for generating a second series of pulses whereof each is delayed by a fixed time from each pulse corresponding to an event detected by the detector, gate means for accepting those pulses in said second series occurring substantially during dead-time periods following each detected event, and means whereby the accepted pulses of said second series may be added to the pulses corresponding to detected events, whereby the said accepted pulses compensate, at least in part, for those events undetected during said dead-time periods and the number of events in the series can thus be counted more accurately.

2. A circuit as claimed in claim 1 and further including means for defining the dead-time period.

3. A circuit as claimed in claim 2 wherein said generating means is adaptable to make said fixed time equal to approximately twice the dead-time period.

4. A circuit as claimed in claim 3 wherein the gate means operate to accept pulses in the second series during periods slightly longer than the dead-time period to compensate, at least in part, for the absence, from said second series of pulses, of pulses corresponding to events undetected during said dead-time periods.

5. A dead-time loss compensating circuit for use with a Geiger-Müller tube comprising means for generating a quenching waveform for said tube, means for deriving a first series of pulses from the leading edges of the quenching waveforms, means for generating a second series of pulses delayed by a fixed amount from said leading edges, gate means controlled by said quenching waveform for accepting those pulses in said second series occuring substantially during the period of said quenching waveform, and means for adding the accepted pulses of said second series to the first series of pulses, whereby the accepted pulses compensate, at least in part, for the nuclear particles undetected by the Geiger-Müller tube during the period of the quenching waveform and the number of particles entering the tube can thus be counted more accurately.

6. A circuit as claimed in claim 5 wherein the means for generating the second series of pulses comprises means triggered from the back edges of the quenching waveforms for generating a rectangular waveform of duration approximately equal to that of the quenching waveform, and means for deriving said second series of pulses from the trailing edges of said rectangular waveforms.

References Cited in the file of this patent
UNITED STATES PATENTS 2,672,561    Lichtman _____ Mar. 16, 1954
2,754,056    Friedman _____ July 10, 1956

OTHER REFERENCES

Ginguich et al.: A Direct-Reading Counting Rate Meter for Random Pulses, Review of Scientific Instruments, December 1936, pp. 450–456.

Simpson: Reduction of the Natural Insensitive Time in G-M Counters, The Physical Review (August 1944), pp. 39–47.

Pulsford: A Count-Rate Meter Having Automatic Correction for Losses Caused by Finite Resolving Time, Electronic Engineering (August 1954), pp. 356 to 359.

Damon et al.: Resolution Losses in Counters and Trigger Circuits, Nucleonics (December 1954), pp. 36 to 39.